US008121306B2

(12) United States Patent
Cilia et al.

(10) Patent No.: US 8,121,306 B2
(45) Date of Patent: Feb. 21, 2012

(54) RANGE-SENSITIVE WIRELESS MICROPHONE WITH OUT-OF-RANGE RECORDING FEATURE

(75) Inventors: Andrew Cilia, McKinney, TX (US); Robert V. Vanman, McKinney, TX (US)

(73) Assignee: Enforcement Video, LLC, Allen, TX (US)

( * ) Notice: Subject to any disclaimer, the term of this patent is extended or adjusted under 35 U.S.C. 154(b) by 853 days.

(21) Appl. No.: 12/228,773

(22) Filed: Aug. 15, 2008

(65) Prior Publication Data

US 2009/0052685 A1 Feb. 26, 2009

Related U.S. Application Data

(60) Provisional application No. 60/956,430, filed on Aug. 17, 2007.

(51) Int. Cl.
*H04B 7/00* (2006.01)

(52) U.S. Cl. .............. 381/77; 381/79; 381/91; 381/113; 455/83; 455/101; 455/133

(58) Field of Classification Search .................. 381/122, 381/1, 11–113; 455/82–84, 101, 132–133; 384/56, 91, 113, 122, 148
See application file for complete search history.

(56) References Cited

U.S. PATENT DOCUMENTS

| | | | | |
|---|---|---|---|---|
| 6,085,072 | A * | 7/2000 | Komiya | 455/83 |
| 7,119,832 | B2 | 10/2006 | Blanco et al. | |
| 7,574,011 | B2 * | 8/2009 | Meyer et al. | 381/113 |

* cited by examiner

*Primary Examiner* — Dung A. Le
(74) *Attorney, Agent, or Firm* — Winstead PC

(57) ABSTRACT

A range-sensitive wireless-microphone method includes receiving an audio input, converting the received audio input into digital data, buffering the digital data, and transmitting the buffered digital data. The method also includes determining whether the transmitted buffered data was successfully received, responsive to a determination that the transmitted buffered data was successfully received deleting the transmitted buffered data, and, responsive to a determination that the transmitted buffered data was not successfully received, retaining the transmitted buffered data and repeating the transmitting step. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims.

32 Claims, 1 Drawing Sheet

RANGE-SENSITIVE WIRELESS MICROPHONE WITH OUT-OF-RANGE RECORDING FEATURE

CROSS-REFERENCE TO RELATED APPLICATIONS

This patent application claims priority from, and incorporates by reference the entire disclosure of, U.S. Provisional Patent Application No. 60/956,430, filed on Aug. 17, 2007.

BACKGROUND

1. Technical Field

The invention relates generally to wireless transmission of recorded audio and, more particularly but not by way of limitation, to a range-sensitive wireless microphone with an out-of-range recording feature.

2. History of Related Art

Personal transceiver devices located on the person of a police officer may be used when the police officer is performing his job duties. Such devices typically allow the police officer to communicate with other police officers, a dispatcher, or others as needed. In some systems, the devices may be used to transmit audio and/or video data wirelessly to a recording device mounted in, for example, the police officer's patrol car.

However, in some circumstances, the police officer encounters an environment in which adequate transmission of the audio and/or video data created by the personal transceiver device ceases to occur. Adequate transmission of the audio and/or video data can cease to occur due, for example, to the police officer exceeding the transmission range of the personal transceiver device or being shielded by a metal building or other object.

When, for example, the personal transceiver device is being utilized along with a patrol-car-based recording device, valuable information regarding the police officer's activities and interactions with others, as well as other potentially valuable evidence can be lost. In some systems, the recording device may simultaneously record video, for example, from a patrol-car-mounted camera. Moreover, even when the personal transceiver device is not being utilized with a separate recording device, information obtained when the personal transceiver device is unable to adequately communicate with, for example, other police officers or a dispatcher, can be valuable. For example, if a police officer is communicating with a dispatcher or another police officer during an interaction with a suspect and adequate communication ceases to occur because the police officer pursues the suspect inside a metal building, information regarding the encounter with the suspect and other events occurring inside the metal building may be lost.

SUMMARY OF THE INVENTION

A range-sensitive wireless-microphone method includes receiving an audio input, converting the received audio input into digital data, buffering the digital data, and transmitting the buffered digital data. The method also includes determining whether the transmitted buffered data was successfully received, responsive to a determination that the transmitted buffered data was successfully received deleting the transmitted buffered data, and, responsive to a determination that the transmitted buffered data was not successfully received, retaining the transmitted buffered data and repeating the transmitting step.

A range-sensitive wireless-microphone article of manufacture includes at least one computer readable medium and processor instructions contained on the at least one computer readable medium. The processor instructions are configured to be readable from the at least one computer readable medium by at least one processor and thereby cause the at least one processor to operate as to perform the following steps: 1) receiving an audio input; 2) converting the received audio input into digital data; 3) buffering the digital data; 4) transmitting the buffered digital data; 5) determining whether the transmitted buffered data was successfully received; 6) responsive to a determination that the transmitted buffered data was successfully received, deleting the transmitted buffered data; and 7) responsive to a determination that the transmitted buffered data was not successfully received, retaining the transmitted buffered data and repeating the transmitting step.

The above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
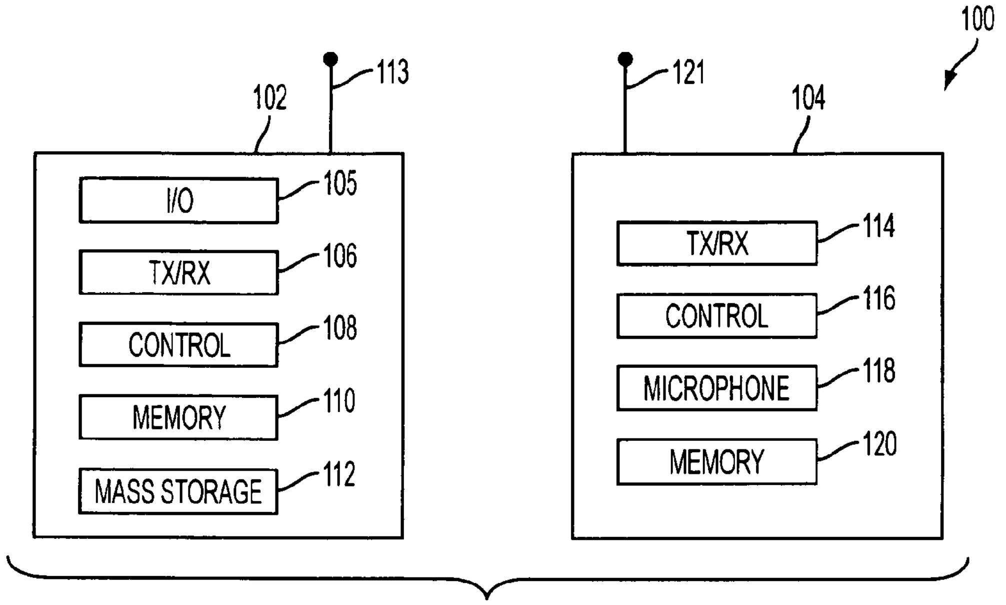
FIG. 1 illustrates a system that includes a recording device and a personal transceiver device.

FIG. 1 illustrates a system 100 that includes a recording device 102 and a personal transceiver device 104. The recording device 102 includes an input/output module 105, a transmit/receive module 106, a control module 108, a memory module 110, and a mass-storage module 112. Those having skill in the art will appreciate that the recording device 102 can include other modules without departing from principles of the invention.

The input/output module 105 may be used to couple the recording device 102 to other devices such as, for example, a camera, a display, or a microphone. The transmit/receive module 106 is coupled to an antenna 113 for transmission and reception of wireless signals with, for example, the personal transceiver device 104. The control module 108 includes control circuitry and/or programming to control operation of the recording device 102 including, for example, compression or decompression of data, whether audio, video, or other types of data. The memory module 110 is typically utilized for short-term data storage, while the mass-storage module 112 is utilized for longer-term data storage. In typical embodiments, the memory module 110 is RAM or flash memory, while the mass-storage module 112 is based on a hard drive, DVD, or other long-term data-storage device.

The personal transceiver device 104 includes a transmit/receive module 114, a control module 116, a microphone 118, a memory module 120, and an antenna 121. Those having skill in the art will appreciate that the personal transceiver device 104 can include other modules without departing from principles of the invention.

The transmit/receive module 114 is coupled to the antenna 121 for transmission and reception of wireless signals with, for example, the recording device 102. The control module 116 includes control circuitry and/or programming to control operation of the personal transceiver device 104 including, for example, compression or decompression of data, whether audio, video, or other types of data. The memory module 120 is typically utilized for short-term data storage. In typical embodiments, the memory module 120 is RAM or flash memory. The microphone 118 is used to capture audio, for example, in the vicinity of a patrol officer who is wearing the personal transceiver device 104. Those having skill in the art will appreciate that the personal transceiver device 104 may also include a camera and other hardware or software necessary to record video as well as audio. The control module 116 in some embodiments includes, for example, circuitry and/or programming to perform analog-to-digital conversion of received audio from the microphone 118 or compression algorithms for compressing the data prior to it being stored in the memory module 120.

The memory module 120 (e.g., flash memory) may be used to record audio and/or video data created by the personal transceiver device 104. In a typical embodiment, data recorded by the personal transceiver device 104 are buffered in the memory module 120 until the data can be adequately transmitted to the recording device 102. Once the data have been adequately transmitted, the data can be deleted from the memory module 120 of the personal transceiver device 104. Inadequate communication may, for example, be transmissions by the personal transceiver device 104 that are deemed to be of insufficient quality. In various embodiments, a time stamp is made by the personal transceiver device 104 in order to facilitate later synchronization of the audio and/or video data recorded, as will be explained in more detail below. In a typical embodiment, the recording device 102 also has a time-stamp system that permits data recorded by the personal transceiver device 104 to be synchronized with data recorded by the recording device 102. Responsive to adequate communication recurring (e.g., transmissions by the personal transceiver device 104 to the recording device 102 being considered successful), successfully transmitted data buffered in the memory module 120 is deleted in order to free that portion of the memory module 120 for further recording. In some embodiments, such as, for example, those embodiments in which a recording device 102 is not utilized, the data recorded by the personal transceiver device 104 can be uploaded wirelessly or via an appropriate cable or other means to a hard drive or other data-storage device as needed.

In some embodiments, the personal transceiver device 104 is adapted to record an event (e.g., audio and/or video) responsive to a start signal from the recording device 102 and stop recording the event responsive to a stop signal from the recording device 102. In some embodiments, data corresponding to start-signal-initiated event recording is saved by the personal transceiver device 104 as a separate instance from data corresponding to non-start-signal-initiated event recording. In such cases, in some embodiments, the data corresponding to the start-signal-initiated event recording may be saved by the personal transceiver device 104 at higher quality (e.g., a greater sample rate) than data, for example, corresponding to non-start-signal-initiated event recording that is typically transmitted automatically to the recording device 102. In some embodiments, a single instance of data may be recorded regardless of whether the data corresponds to start-signal-initiated recording and quality of the data saved by the personal transceiver device 104 adjusted responsive to a start signal. Such systems may be used to allow events deemed to be particularly important to be recorded at higher quality.

The personal transceiver device 104 may, for example, be adapted to delay transmission of data corresponding to start-signal-initiated event recording until the personal transceiver device 104 receives a command, for example, from: 1) a user via a personal computer, the recording device 102, or otherwise; or 2) the personal computer, the recording device 102, or another device absent a user command. In a typical embodiment, the data corresponding to start-signal-initiated event recording is available for download at the end of the event, for example, via cable, wireless, or other appropriate means.

In a typical embodiment, video recorded by the recording device 102 is buffered until corresponding data packets of recorded sound arrive from the personal transceiver device 104. Responsive to receipt by the recording device 102, the data packets are synchronized with, for example, video recorded by the recording device 102 and both are usually recorded in final format (e.g., DVD, memory card, etc.). The wireless link may utilize a short-range protocol such as, for example, Bluetooth, UWB, or Zigbee, in which case the data are uploaded, for example, when the officer gets back in the patrol car. In another option, a longer-range radio protocol that maintains radio contact in most cases and depends on the memory module 120 only when the officer is out of range (e.g., 1,000 feet) may be used.

In various embodiments, there is a two-way communication link between the recording device 102 and the personal transceiver device 104 worn by the police officer. The personal transceiver device 104 digitizes sound from the microphone 118 into data packets and places the data packets in the memory module 120, which operates as a first-in-first-out (FIFO) buffer. The personal transceiver device 104 repeatedly sends an oldest data packet until the personal transceiver device 104 receives an acknowledgement from the recording device 102. Responsive to acknowledgement by the recording device 102, the personal transceiver device 104 deletes the corresponding data packet and sends the next one. Packet integrity is typically achieved by the use of checksum data at the end of the data packets. Reception of a data packet is acknowledged only if a checksum calculated at the recording device 102 matches checksum data contained in the data packet. Any of a number of guaranteed-delivery protocols, such as, for example, TCP/IP, may be used to provide the needed acknowledge-and-retransmission functionality.

In a typical embodiment, the personal transceiver device 104 continually stores digitized data packets to the memory module 120 and continually tries to deliver the stored data packets. During periods of sufficient radio contact (i.e., when the personal transceiver device 104 is successfully transmitting data), the data packets are transmitted by the personal transceiver device 104 promptly after being stored in the memory nodule 120. As the radio signal transmitted by the personal transceiver device 104 grows weaker, some of the transmitted data packets typically experience errors and are not acknowledged by the recording device 102, which causes a retransmission by the personal transceiver device 104 of the same data packet and slows the effective data-packet transmission rate. If the effective data-packet transmission rate falls below the rate at which data packets are created by the personal transceiver device 104, the data packets start to accumulate in the memory module 104 of the personal transceiver device 104. Therefore, the personal transceiver device 104 must have enough capacity in the memory module 120 to store data corresponding to a longest anticipated event (e.g., approximately 8 hours).

In various embodiments, sound may be digitally compressed at the personal transceiver device 104 in order to conserve memory resources. A number of compression algorithms exist, such as, for example, mp3 and dss. When compression is employed, the personal transceiver device 104 may transmit recorded sound (and possibly video) in compressed form in the data packets to minimize the amount of data to be transmitted or in uncompressed form to preserve compatibility, for example, with a recording device 102 that expects the data packets in an uncompressed format.

Figure 2:
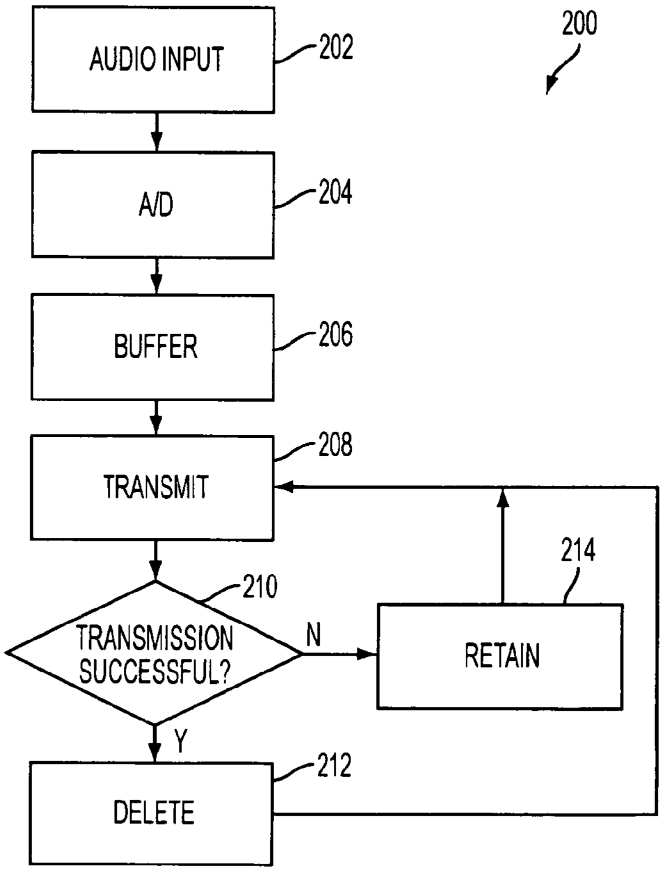
FIG. 2 is a process flow for operation of a personal transceiver device.

FIG. 2 illustrates a process flow 200 for operation of an illustrative personal transceiver device. The process flow 200 begins at step 202. At step 202, a microphone of the personal transceiver device receives audio input. From step 202, execution proceeds to step 204. At step 204, the personal transceiver device performs analog-to-digital conversion of the received audio input from the microphone.

From step 204, execution proceeds to step 206. Those having skill in the art will appreciate that the operations performed at step 204 may include time-stamping operations, error-control operations, and data-compression operations. At step 206, data digitized at step 204 are buffered in memory of the personal transceiver device. From step 206, execution proceeds to step 208. At step 208, all or some of data previously digitized and buffered is transmitted by the personal transceiver device. From step 208, execution proceeds to step 210.

At step 210, a determination is made as to whether the data transmitted at step 208 was successful. For example, the personal transceiver device may utilize a FIFO buffer in conjunction with an acknowledgement from a receiving device such as, for example, a recording device, during the step 210 in order to verify that transmission of data transmitted at step 208 was successful.

If, at step 210, it is determined that the transmission was successful, the data transmitted at step 208 are deleted at step 212. However, if it is determined at step 210 that the transmission of the data transmitted at step 208 was not successful, the data transmitted at step 208 are retained at step 214 and execution returns to step 208 so that the data previously transmitted at step 208 can be retransmitted. From step 212, execution proceeds to step 208, at which step new data that has been buffered at step 206 are transmitted.

In a typical embodiment, a transmitted data packet includes a header, a time stamp, recorded data, and error-control data. The header typically contains information about the originator and the destination of the data packet, such as identification of a personal transceiver device serial number. The header also typically contains protocol-specific information required by the transmission protocol, such as packet number, packet size, and packet type. The time stamp typically contains time information to be used to maintain synchronization, for example, between video recorded by the recording device from a patrol-car-mounted video camera and sound information from the personal transceiver device. Synchronization is often necessary, since the sound information may not arrive at the recording device until some time after the video was captured by the recording device. The time stamp may be, for example, generated from a real-time clock in the personal transceiver device that has been previously synchronized to a clock in the recording device. Time-stamp resolution is typically in the range of several milliseconds.

The error-control data usually include a set of cyclic redundant checksum (CRC) data used for data integrity verification. Data-packet errors suffered during transmission are detected by the recording device when a received CRC does not match a calculated CRC. In another option, the error-control data may include Forward Error Correction (FEC) data that allow the recording device to correct some errors without a need for data retransmission by the personal transceiver device.

Various embodiments of the present invention may be implemented, at least in part, for example, in hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory).

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A range-sensitive wireless-microphone method comprising:

receiving an audio input;

converting the received audio input into digital data;

buffering the digital data;

transmitting the buffered digital data;

determining whether the transmitted buffered data was successfully received;

responsive to a determination that the transmitted buffered data was successfully received, deleting the transmitted buffered data; and responsive to a determination that the transmitted buffered data was not successfully received, retaining the transmitted buffered data and repeating the transmitting step.

2. The range-sensitive wireless-microphone method of claim 1, comprising, responsive to the deleting step, transmitting a subsequently buffered digital data.

3. The range-sensitive wireless-microphone method of claim 1, wherein the step of converting the received audio input into digital data comprises compressing the digital data.

4. The range-sensitive wireless-microphone method of claim 1, wherein the determining step comprises evaluating an acknowledgment received from a receiving device indicating whether the transmitted buffered data was successfully received.

5. The range-sensitive wireless-microphone method of claim 4, wherein the evaluating step comprises using a cyclic redundant checksum.

6. The range-sensitive wireless-microphone method of claim 1, comprising:

calculating a cyclic redundant checksum of the buffered digital data; and transmitting the cyclic redundant checksum with the buffered digital data.

7. The range-sensitive wireless-microphone method of claim 6, wherein the determining step comprises:

receiving a cyclic redundant checksum calculated by a receiving device of the buffered transmitted digital data; and comparing the cyclic redundant checksum calculated by the receiving device of the buffered transmitted digital data and the cyclic redundant checksum of the buffered digital data.

8. The range-sensitive wireless-microphone method of claim 7, wherein the determining step comprises, responsive to the cyclic redundant checksum calculated by the receiving device of the buffered transmitted digital data and the cyclic redundant checksum of the buffered digital data being identical, determining that the transmitted buffered data was successfully received.

9. The range-sensitive wireless-microphone method of claim 1, comprising performing a time-stamp operation on the digital data, a time stamp resulting therefrom indicating when the audio input was received.

10. The range-sensitive wireless-microphone method of claim 1, comprising, responsive to a buffer capacity being approached, alerting a user.

11. The range-sensitive wireless-microphone method of claim 1, comprising:

wherein the digital data is buffered at a first quality level; and responsive to a start command, buffering the digital data at a second quality level that is greater than the first quality level.

12. The range-sensitive wireless-microphone method of claim 11, comprising, responsive to a stop command, discontinuing buffering the digital data at the second quality level.

13. The range-sensitive wireless-microphone method of claim 12, comprising, responsive to a transmit command from a receiving device, transmitting the digital data buffered at the second quality level.

14. The range-sensitive wireless-microphone method of claim 13, wherein the step of transmitting the digital data buffered at the first quality level is performed absent a transmit command from a receiving device.

15. The range-sensitive wireless-microphone method of claim 11, comprising, responsive to the start command, discontinuing buffering the digital data at the first quality level.

16. The range-sensitive wireless-microphone method of claim 11, comprising, following the start command, continuing to buffer the digital data at the first quality level.

17. A range-sensitive wireless-microphone article of manufacture comprising:

at least one computer readable medium;

processor instructions contained on the at least one computer readable medium, the processor instructions configured to be readable from the at least one computer readable medium by at least one processor and thereby cause the at least one processor to cause a personal transceiver device to operate as to perform the following steps:

receiving an audio input;

converting the received audio input into digital data;

buffering the digital data;

transmitting the buffered digital data;

determining whether the transmitted buffered data was successfully received;

responsive to a determination that the transmitted buffered data was successfully received, deleting the transmitted buffered data; and responsive to a determination that the transmitted buffered data was not successfully received, retaining the transmitted buffered data and repeating the transmitting step.

18. The range-sensitive wireless-microphone article of manufacture of claim 17, the processor instructions configured to cause the at least one processor to cause the personal transceiver device to operate as to perform the following:

responsive to the deleting step, transmitting subsequently buffered digital data.

19. The range-sensitive wireless-microphone article of manufacture of claim 17, wherein the step of converting the received audio input into digital data comprises compressing the digital data.

20. The range-sensitive wireless-microphone article of manufacture of claim 17, wherein the determining step comprises evaluating an acknowledgment received from a receiving device indicating whether the transmitted buffered data was successfully received.

21. The range-sensitive wireless-microphone article of manufacture of claim 20, wherein the evaluating step comprises using a cyclic redundant checksum.

22. The range-sensitive wireless-microphone article of manufacture of claim 17, the processor instructions configured to cause the at least one processor to cause the personal transceiver device to operate as to perform the following:

calculating a cyclic redundant checksum of the buffered digital data; and transmitting the cyclic redundant checksum with the buffered digital data.

23. The range-sensitive wireless-microphone article of manufacture of claim 22, wherein the determining step comprises:

receiving a cyclic redundant checksum calculated by a receiving device of the buffered transmitted digital data; and comparing the cyclic redundant checksum calculated by the receiving device of the buffered transmitted digital data and the cyclic redundant checksum of the buffered digital data.

24. The range-sensitive wireless-microphone article of manufacture of claim 23, wherein the determining step comprises, responsive to the cyclic redundant checksum calculated by the receiving device of the buffered transmitted digital data and the cyclic redundant checksum of the buffered digital data being identical, determining that the transmitted buffered data was successfully received.

25. The range-sensitive wireless-microphone article of manufacture of claim 17, the processor instructions configured to cause the at least one processor to cause the personal transceiver device to operate as to perform the following:

performing a time-stamp operation on the digital data, a time stamp resulting therefrom indicating when the audio input was received.

26. The range-sensitive wireless-microphone article of manufacture of claim 17, the processor instructions configured to cause the at least one processor to cause the personal transceiver device to operate as to perform the following:

responsive to a buffer capacity being approached, alerting a user.

27. The range-sensitive wireless-microphone article of manufacture of claim 17, the processor instructions configured to cause the at least one processor to cause the personal transceiver device to operate as to perform the following:

wherein the digital data is buffered at a first quality level; and responsive to a start command, buffering the digital data at a second quality level that is greater than the first quality level.

28. The range-sensitive wireless-microphone article of manufacture of claim 27, the processor instructions configured to cause the at least one processor to operate as to cause the personal transceiver device to perform the following:

responsive to a stop command, discontinuing buffering the digital data at the second quality level.

29. The range-sensitive wireless-microphone article of manufacture of claim 28, the processor instructions configured to cause the at least one processor to cause the personal transceiver device to operate as to perform the following:

responsive to a transmit command from a receiving device, transmitting the digital data buffered at the second quality level.

30. The range-sensitive wireless-microphone article of manufacture of claim 29, wherein the step of transmitting the digital data buffered at the first quality level is performed absent a transmit command from a receiving device.

31. The range-sensitive wireless-microphone article of manufacture of claim 27, the processor instructions configured to cause the at least one processor to cause the personal transceiver device to operate as to perform the following:

responsive to the start command, discontinuing buffering the digital data at the first quality level.

32. The range-sensitive wireless-microphone article of manufacture of claim 27, the processor instructions configured to cause the at least one processor to cause the personal transceiver device to operate as to perform the following:

following the start command, continuing to buffer the digital data at the first quality level.

* * * * *